Figure 1:
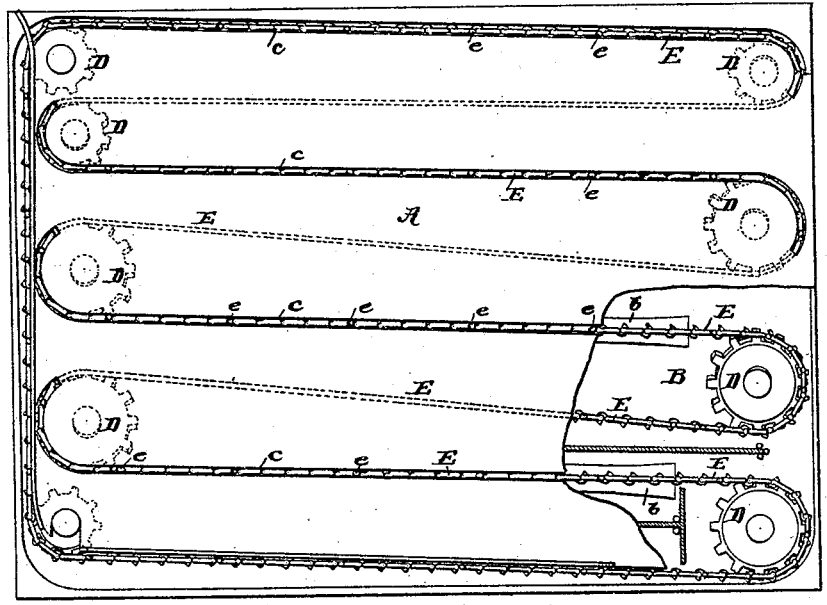

(No Model.)

W. D. EWART.
CONVEYER FOR HARVESTERS.

No. 251,339. Patented Dec. 20, 1881.

Attest:
Geo. H. Graham.
Jacob Felbel.

Inventor,
W. D. Ewart
By J. N. McIntire
Atty.

UNITED STATES PATENT OFFICE.

WILLIAM D. EWART, OF CHICAGO, ILLINOIS.

CONVEYER FOR HARVESTERS.

SPECIFICATION forming part of Letters Patent No. 251,339, dated December 20, 1881.

Application filed August 1, 1881. (No model.)

*To all whom it may concern:*

Be it known that I, WILLIAM DANA EWART, of Chicago, in the county of Cook and State of Illinois, have invented certain new and useful Improvements in Conveyers for Harvesters; and I do hereby declare that the following is a full and exact description thereof, reference being had to the accompanying drawings, making part of this specification.
My invention relates to an improvement in the conveyer or carrier mechanism of the platform of that kind of harvester in which the mechanism alluded to involves the employment of traveling bands, belts, or chains mounted within the platform to run with one edge uppermost, as shown and described in and made the subject of application for Letters Patent by one James M. Dodge. In this sort of carrier mechanism the grain-platform may be made very thin, comparatively; but the fingers or other devices which protrude upward through the floor of the platform have to be adapted to recede beneath said floor during their backward or return movements in a manner similar to the adaptation of such fingers on that kind of carrier mechanism in which the belts, bands, or chains carrying them are arranged to run on pulleys or wheels having their axes arranged about horizontally, instead of vertically, as in the Dodge contrivance. This mode of operation of the said fingers in either the Dodge or the older contrivances necessitates more or less complication of mechanism, liability to derangement, &c., which it is the main object of my invention to avoid.

I propose to provide for use a kind of grain-platform carrier mechanism which, while it shall possess substantially all the advantages of the Dodge contrivance over those which went before it, shall also avoid entirely the use of fingers made movable relatively to the chain, belt, or band to which they are attached, and will therefore render unnecessary any devices auxiliary to the fingers for the purpose of effecting the recession of said fingers within the platform during the retrograde movement of the said fingers; and to this main end and object, and to provide for use at the same time a contrivance exceedingly simple, durable, and desirable in operation, my invention consists in the employment, in combination with the grain-platform, of a suitable endless chain, belt, or band, or suitable chains, belts, or bands provided with immovably-attached carrier-fingers, and arranged so that such portion or portions of the chain or chains as move in a direction opposite to that in which the grain is to be fed along on the platform shall be located always far enough below the level of the floor of said platform to prevent the projection (upward) through the top of said platform of the carrier-fingers attached to said portion or portions of said chain or chains, while the other part or parts of the said chain or chains shall be located in such relation to the top of said platform that the fingers attached thereto may project up through said floor, all as will be hereinafter more fully explained.

To enable those skilled in the art to make and use my invention, I will now proceed to more fully explain it, referring by letters to the accompanying drawings, forming part of this specification, and in which—

Figure 2:
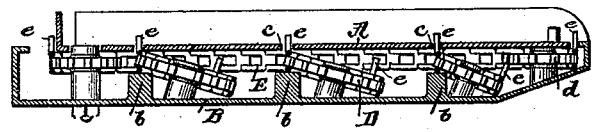
Figure 3:
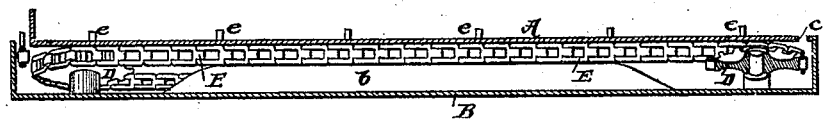

Figure 1 is a top view, Fig. 2 a cross-section, and Fig. 3 a longitudinal section, of a grain-platform provided with my improved conveyer or carrier mechanism.

In the several figures the same part will be found designated by the same letter of reference.

A is the top, and B the bottom, of the grain-platform, the former of which parts has in it slots *c* for the accommodation of carrier-fingers, that rake or feed the cut and fallen grain along sidewise on the floor A in the direction indicated by the arrows. Within the platform is arranged a series of chain-wheels, D, over the peripheries of which is arranged, by preference, a single endless chain, E, which is either formed or provided along its uppermost edge with numerous upwardly-projecting fingers *e*. The chain-wheels D are arranged, as shown, with their axes of motion inclined from a perpendicular position to an extent sufficient to throw the wheels so far out of level with the platform-floor that either the foremost or the rearmost point of the periphery of each (according to whether the wheel shall be inclining downward at the rear or front part) shall be high enough to hold the upper edge of the chain at that point in the periphery of the wheel high enough to run close to the under surface of the floor A, while the opposite point of the said periphery shall be low enough to hold the upper edge of the chain at that point so low that its carrier-fingers cannot protrude through the floor A.

To insure the support of the chain in the desired line or plane along that part of it which is most elevated, the bottom B of the platform may be either formed or provided with supporting ledges or devices at $b$, as clearly shown.

Of course, in the form shown of my invention in which a single chain is carried around the series of wheels, the obliquity of the chain-wheels at each side of the platform must be in a direction just opposite to the direction of inclination of the wheels at the other side; but in a case where several separate endless chains should be used, each running on one pair of wheels, the latter would incline in the same direction.

The chain and the wheels carrying it, or, in the case of the use of several endless chains, all of the latter as well as the wheels, are of course driven in the proper manner and direction by the usual means, and in operation the more elevated portions of the chain or chains will, it will be seen, cause the carrier-fingers $e$ attached thereto to force the grain on the platform along in the desired manner toward that side of the platform at which the elevator device is located, while, after having performed this office, said fingers will descend beneath the floor A as the chain travels along with the descending part of the chain-wheel's periphery, and will thence move along across the whole width of the platform in such depressed position, and reascend to a working or operative position at the other side of the platform; and thus, without any movement of the fingers relatively to the chain and without any auxiliary devices, are the fingers caused to travel across the platform in one direction, projecting above the floor A, to rake the grain, and to travel back in an opposite direction beneath the floor A.

Of course other devices than the chain shown may be employed and other arrangements of the chain or chains and wheels or pulleys than that shown may be adopted without departing from the spirit of my invention, so long as the described principle of construction and mode of operation of the contrivance shall be retained, the gist of my invention resting in having the upper edge of the traveling band or belt, which has the fingers attached to it, arranged to move at a higher level during a part of its length than at another part, as I have shown and described.

What I claim as new, and desire to secure by Letters Patent, is—

In combination with the grain-platform, a carrier chain or chains, or equivalent device, provided with fingers immovably attached to it, and means for running said chain or chains with one part of the upper edge higher than the other, substantially in the manner and for the purpose set forth.

In witness whereof I have hereunto set my hand this 27th day of July, 1881.

WILLIAM D. EWART.

In presence of—
GEO. E. MARSHALL,
T. S. FAUNTLEROY.